(12) United States Patent
Langlais et al.

(10) Patent No.: US 9,774,226 B2
(45) Date of Patent: Sep. 26, 2017

(54) COMPONENT CONFIGURED TO STIFFEN AN ELECTRIC MOTOR ASSEMBLY

(71) Applicant: Seagate Technology LLC, Cupertino, CA (US)

(72) Inventors: Timothy E. Langlais, Minneapolis, MN (US); Matthew M. McConnell, Scotts Valley, CA (US); Paco G. Flores, Felton, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/087,881

(22) Filed: Mar. 31, 2016

(65) Prior Publication Data

US 2016/0218587 A1    Jul. 28, 2016

Related U.S. Application Data

(63) Continuation of application No. 13/966,042, filed on Aug. 13, 2013, now Pat. No. 9,318,930.

(51) Int. Cl.
| | |
|---|---|
| *G11B 25/04* | (2006.01) |
| *H02K 5/24* | (2006.01) |
| *G11B 19/20* | (2006.01) |
| *H02K 7/14* | (2006.01) |
| *H02K 11/30* | (2016.01) |
| *G11B 5/48* | (2006.01) |

(52) U.S. Cl.
CPC ............ *H02K 5/24* (2013.01); *G11B 5/4813* (2013.01); *G11B 19/20* (2013.01); *G11B 25/043* (2013.01); *H02K 7/14* (2013.01); *H02K 11/30* (2016.01)

(58) Field of Classification Search
CPC .......... H02K 5/24; H02K 7/14; G11B 25/043
USPC .............. 360/234, 99.08; 310/51, 91, 52, 88
See application file for complete search history.

(56) References Cited

U.S. PATENT DOCUMENTS

| | | | |
|---|---|---|---|
| 5,214,549 A | 5/1993 | Baker et al. | |
| 5,598,306 A | 1/1997 | Frees et al. | |
| 5,875,067 A | 2/1999 | Morris et al. | |
| 5,999,374 A | 12/1999 | Kim | |
| 6,437,464 B1 * | 8/2002 | Neal ................... | G11B 19/2009 310/254.1 |
| 6,501,616 B1 * | 12/2002 | Neal ................... | G11B 19/2009 360/99.08 |
| 6,603,633 B2 | 8/2003 | Trammell et al. | |
| 6,608,732 B2 | 8/2003 | Bernett et al. | |
| 6,617,721 B1 * | 9/2003 | Neal ................... | G11B 19/2009 310/254.1 |
| 6,657,812 B2 | 12/2003 | Serizawa et al. | |
| 6,697,217 B1 | 2/2004 | Codilian | |
| 6,753,628 B1 * | 6/2004 | Neal ................... | G11B 19/2009 29/598 |
| 8,102,620 B2 | 1/2012 | Martino | |
| 8,264,833 B2 | 9/2012 | Fang et al. | |
| 8,358,482 B2 | 1/2013 | Marlow et al. | |
| 8,767,353 B2 | 7/2014 | Sudo et al. | |
| 2004/0232782 A1 * | 11/2004 | Xu ..................... | G11B 19/2009 310/67 R |

(Continued)

*Primary Examiner* — Allen T Cao (57) ABSTRACT

An apparatus includes a first component and a second component. The second component is located at a first position. The second component includes a first connection to the first component. The first position and the first connection are configured to stiffen an electric motor assembly.

18 Claims, 7 Drawing Sheets

(56) References Cited

U.S. PATENT DOCUMENTS

| | | | |
|---|---|---|---|
| 2005/0057107 A1* | 3/2005 | Xu | H02K 1/146 |
| | | | 310/67 R |
| 2005/0231848 A1 | 10/2005 | Hong et al. | |
| 2006/0075412 A1* | 4/2006 | Feliss | G11B 33/08 |
| | | | 720/600 |
| 2009/0164145 A1 | 6/2009 | Koo et al. | |
| 2011/0096494 A1 | 4/2011 | Cochrane | |
| 2012/0014241 A1 | 1/2012 | Yip et al. | |
| 2012/0087038 A1 | 4/2012 | Kwon | |
| 2012/0162816 A1 | 6/2012 | Kaneko et al. | |
| 2013/0283877 A1* | 10/2013 | Law | B21K 23/00 |
| | | | 72/39 |

\* cited by examiner

COMPONENT CONFIGURED TO STIFFEN AN ELECTRIC MOTOR ASSEMBLY

RELATED APPLICATIONS

This application claims the benefit and priority to the U.S. patent application Ser. No. 13/966,042 filed on Aug. 13, 2013, assigned to the same assignee, and it is incorporated in its entirety by reference herein.

BACKGROUND

An electric motor may use stators, magnets, and/or coils to rotate an object. For example, a motor may rotate data storage disks used in a disk drive storage device. The data storage disks may be rotated at high speeds during operation using the stators, magnets, and/or coils. For example, magnets and coils may interact with a stator to cause rotation of the disks relative to the stator.

In some cases, electric motors are manufactured with increasingly reduced sizes. For example, in order to reduce the size of a disk drive storage device, the size of various components of the disk drive storage device may be reduced. Such components may include the electric motor, stator, magnets, coils, and motor parts. The precision at which the stators, magnets, coils and motor parts are manufactured may affect the acoustical properties and performance of the electric motor.

SUMMARY

An apparatus includes a first component and a second component. The second component is located at a first position. The second component includes a first connection to the first component. The first position and the first connection are configured to stiffen an electric motor assembly.

These and other aspects and features of embodiments may be better understood with reference to the following drawings, description, and appended claims.

BRIEF DESCRIPTION OF DRAWINGS

The present invention is illustrated by way of example, and not by way of limitation, in the figures of the accompanying drawings and in which like reference numerals refer to similar elements.

DETAILED DESCRIPTION

Before various embodiments are described in greater detail, it should be understood that the embodiments are not limited to the particular embodiments described and/or illustrated herein, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Disks of a hard disk drive ("HDD"), such as that of FIG. 1 described herein below, may be rotated at high speeds by means of an electric motor including a spindle assembly mounted on a base of a housing. Such electric motors include a stator assembly including a number of stator teeth, each extending from a yoke. Each stator tooth of the number of stator teeth supports a field coil that may be energized to polarize the field coil. Such electric motors further include one or more permanent magnets disposed adjacent to the number of stator teeth. As the number of field coils disposed on the number of stator teeth are energized in alternating polarity, the magnetic attraction or repulsion of a field coil to an adjacent permanent magnet causes the spindle, including a hub, of the spindle motor assembly to rotate, thereby rotating the disks for read/write operations by one or more read-write heads.

Various means may be used to manufacture motor parts and corresponding structures using thinner materials and smaller size. For example, a HDD may have a relatively thin base with a relatively heavy magnet in one corner and a disk stack in the middle with a pivot between the disk stack and the heavy magnet. The properties of the magnet and the inertial properties of the spinning disk stack may create a balance to allow the pivot in between to stay aligned with the disk and prevent tilting with respect to the disk stack. During operation of the HDD, each respective component of the HDD may have respective movement properties (e.g., vibration). Such movement properties can have undesirable effects including resonant vibrations, shock response, and acoustical issues.

On the other hand and according to embodiments described herein, the various movement properties of components within a device may be adjusted based on the shape of a particular component, the location, and the connection or attachment points of the components. The adjustment of the movement properties of the components allows the movement properties to be tuned or brought within an acceptable range. For example, the stiffness, damping, vibration control, and response of HDD components may be adjusted. In some embodiments, the location of HDD components is adjusted to change the overall movement properties of the overall HDD (e.g., vibration response).

In various embodiments, HDD components are coupled together (e.g., glued, screwed, etc.) to adjust the movement properties of the HDD components (e.g., overall movement properties of the HDD). In some embodiments, HDD components may be coupled on top and bottom to a base and cover, respectively, thereby adjusting the movement properties of the HDD components. In various embodiments, additional components (e.g., structural, dummy, or imitation components) are added to the HDD to adjust the movement properties of the HDD. Some embodiments are configured to rearrange each of a plurality of components and the respective connections of the plurality of components to control vibration (e.g., by increasing stiffness, damping, and vibration control).

Figure 1:
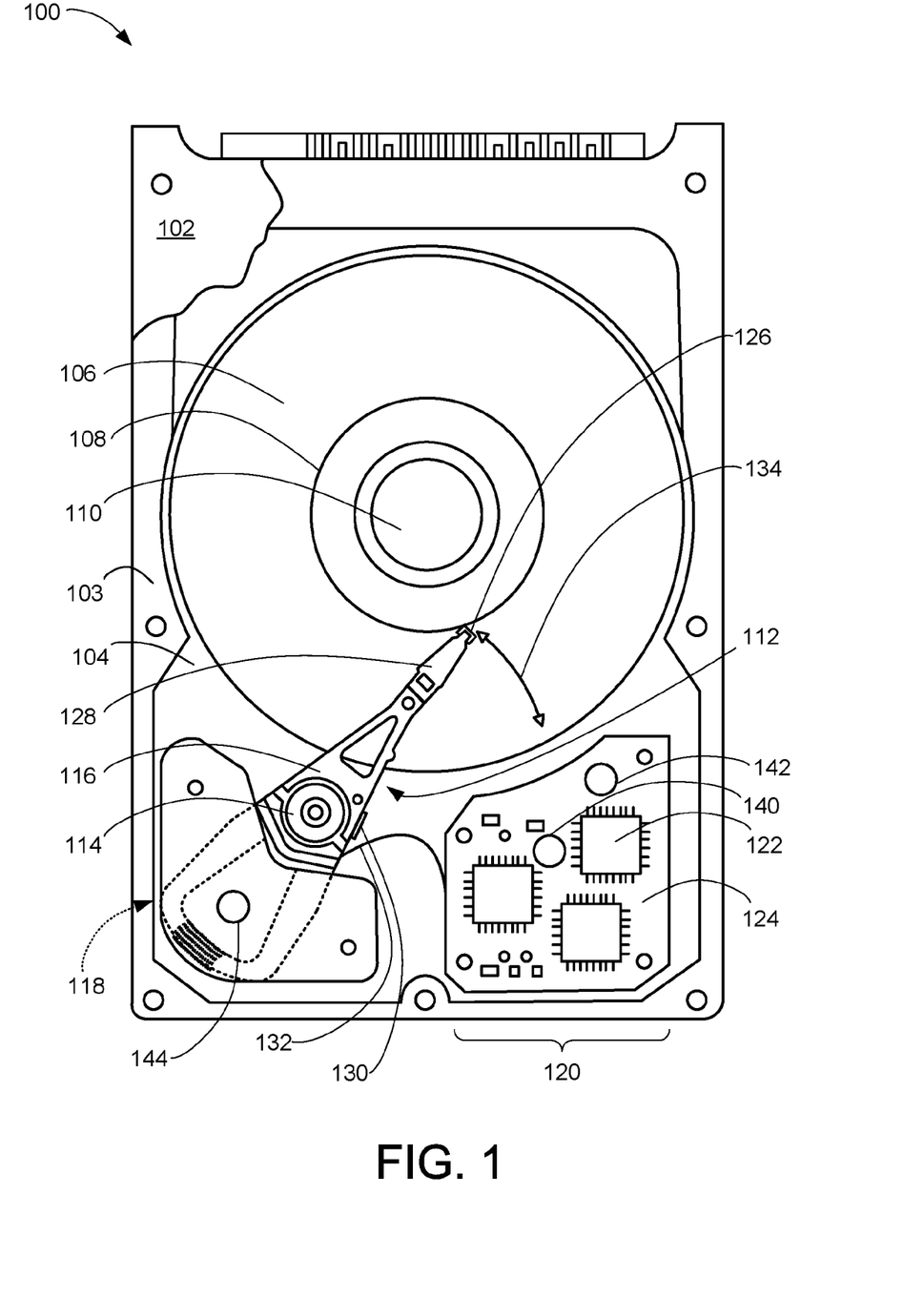
FIG. 1 provides a plan view of a hard disk drive including a printed circuit board assembly (PCBa) attached to a base, according to one aspect of the present embodiments.

FIG. 1 provides a plan view of a number of the components in a hard disk drive 100, including a printed circuit board assembly (PCBa) attached to a base, according to one aspect of the present embodiments. In order to better describe embodiments, a few of the components in the hard disk drive 100 will be briefly described.

Hard disk drive 100 may include a housing assembly including a cover 102 that mates with a base deck having a frame 103 and a floor or base 104, which housing assembly provides a protective space for various hard disk drive components. The hard disk drive 100 includes one or more data storage disks 106 of computer-readable data storage media. Typically, both of the major surfaces of each data storage disk 106 include a number of concentrically disposed tracks for data storage purposes. Each data storage disk 106 is mounted on a hub 108, which in turn is rotatably interconnected with the base deck and/or cover 102. One or more data storage disks 106 may be mounted in vertically spaced and parallel relation on the hub 108. A spindle motor assembly 110 rotates the data storage disks 106.

The hard disk drive 100 also includes an actuator arm assembly 112 that pivots about a pivot bearing 114, which in turn is rotatably supported by the base deck and/or cover 102. The actuator arm assembly 112 includes one or more individual rigid actuator arms 116 that extend out from near the pivot bearing 114. Multiple actuator arms 116 may be disposed in vertically spaced relation, with one actuator arm 116 being provided for each major data storage surface of each data storage disk 106 of the hard disk drive 100. Movement of the actuator arm assembly 112 is provided by an actuator arm drive assembly, such as a voice coil motor 118 or the like. The voice coil motor 118 is a magnetic assembly that controls the operation of the actuator arm assembly 112 under the direction of control electronics 120. The control electronics or print circuit board assembly (PCBa) 120 may include a number of integrated circuits 122 coupled to a printed circuit board (PCB) 124. The control electronics 120 may be coupled to the voice coil motor assembly 118, a slider 126, or the spindle motor assembly 110 using interconnects that can include pins, cables, or wires (not shown).

A load beam or suspension 128 is attached to the free end of each actuator arm 116 and cantilevers therefrom. Typically, the suspension 128 is biased generally toward its corresponding data storage disk 106 by a spring-like force. The slider 126 is disposed at or near the free end of each suspension 128. What is commonly referred to as the read-write head (e.g., transducer) is appropriately mounted as a head unit (not shown) under the slider 126 and is used in hard disk drive read/write operations.

The head unit under the slider 126 is connected to a preamplifier 130, which is interconnected with the control electronics 120 of the hard disk drive 100 by a flex cable 132 that is typically mounted on the actuator arm assembly 112. Signals are exchanged between the head unit and its corresponding data storage disk 106 for hard disk drive read/write operations. In this regard, the voice coil motor 118 is utilized to pivot the actuator arm assembly 112 to simultaneously move the slider 126 along a path 134 and across the corresponding data storage disk 106 to position the head unit at the appropriate position on the data storage disk 106 for hard disk drive read/write operations. Various embodiments for adjusting the stiffness, damping, vibration control, and response of HDD components will now be described in further detail.

In an embodiment, frame 103 may be configured to provide stiffness around the perimeter of hard disk drive 100. The pivot rotational axis may be tied to or between cover 102 and base 104. As a result, spans between the pivot attach area and frame 103 may experience increased deflection during vibration or shock of hard disk drive 100 (e.g., during the operation of hard disk drive 100). Embodiments are configured to locate and connect components into such spans thereby increasing stiffness and damping thereby reducing the undesirable effects of vibration and shock.

PCBa 120 may be linked with base 104 to improve stiffness. In some embodiments, PCBa 120 includes optional attachment points 140-142. Attachment points 140-142 allow PCBa 120 to be attached to floor or base 104. In some embodiments, attachment points 140-142 allow PCBa 120 to be adhered (e.g. glued, screwed, etc.) to base 104 thereby increasing stiffness, damping, and/or vibration response of base 104. PCBa 120 may be attached at a location where deflection is expected to or does in fact occur. In some embodiments, PCBa 120 is connected to a substantially middle portion of base 104. In various embodiments, attachment points 140-142 include structures configured for attaching structures to base 104 and/or cover 102. In some embodiments, base 104 includes steel (e.g., stamped steel) and the attachment of PCBa 120 to base 104 increases the stiffness of the steel.

An additional component may be connected to cover 102 to improve vibration control. In some embodiments, a component may be added to improve performance (e.g., stiffness) while the component is without any other function. In various embodiments, hard disk drive 100 includes optional structure 144 (e.g., a pole) configured to attach voice coil motor 118 to cover 102. Structure 144 may be shaped and positioned to increase the overall stiffness, damping, and/or vibration response of hard disk drive 100.

Figure 2:
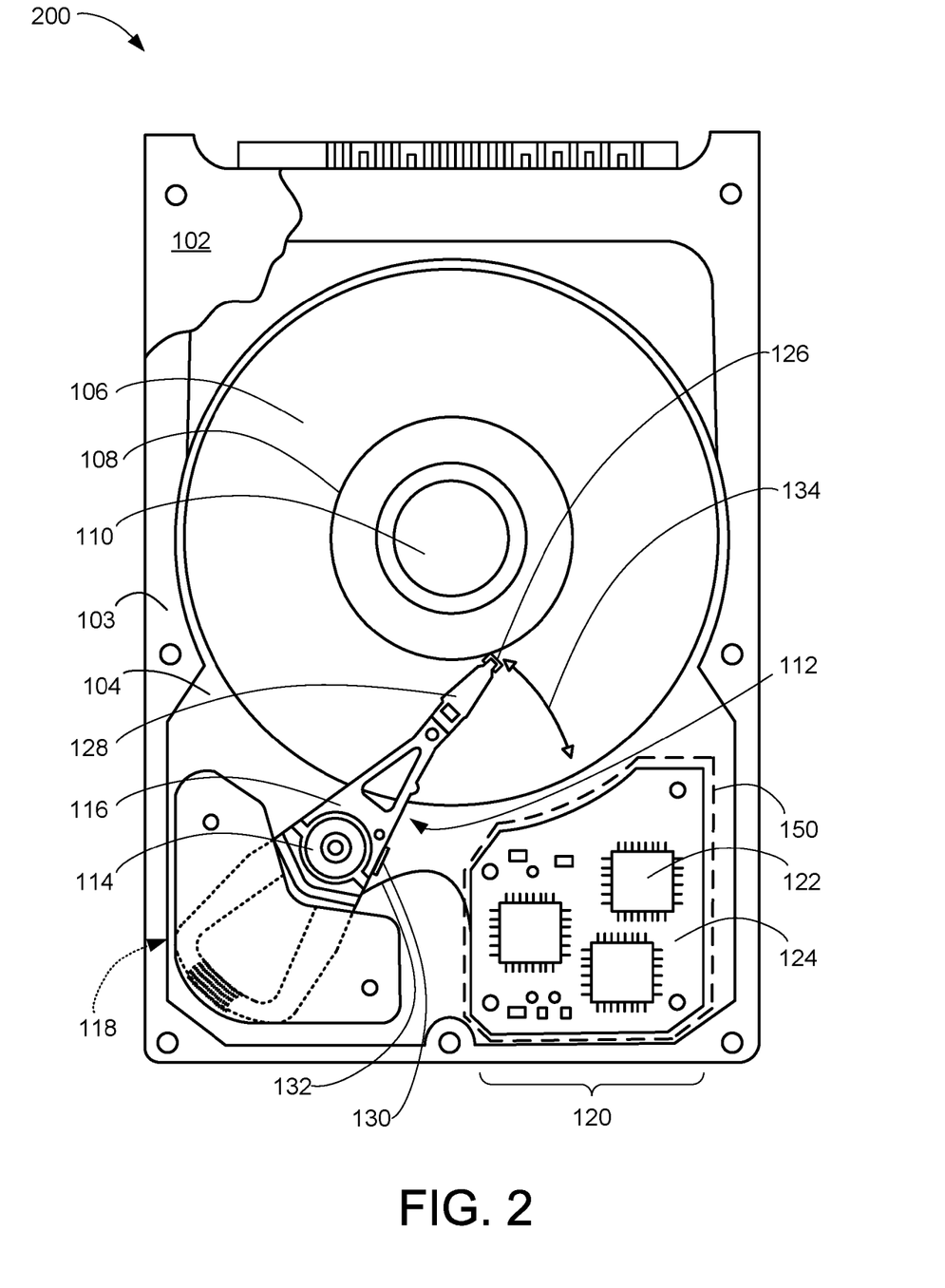
FIG. 2 provides a plan view of a hard disk drive including a PCBa laminated to a base, according to one aspect of the present embodiments.

FIG. 2 provides a plan view of a hard disk drive including a PCBa laminated to a base, according to one aspect of the present embodiments. Elements of hard disk drive 200 having the same reference numerals as hard disk drive 100 may perform substantially similar functions as described herein with respect to hard disk drive 100. Hard disk drive 200 includes laminate 150. Laminate 150 attaches PCBa 120 to base 104 thereby increasing the stiffness, damping, and vibration control of hard disk drive 200. In some embodiments, laminate 150 is formed by laminating PCBa 120 to base 104. In various embodiments, base 104 includes a flat portion and PCBa 120 is laminated to base 104 with, for example, a viscoelastic damping laminate configured to dampen vibration.

Figure 3:
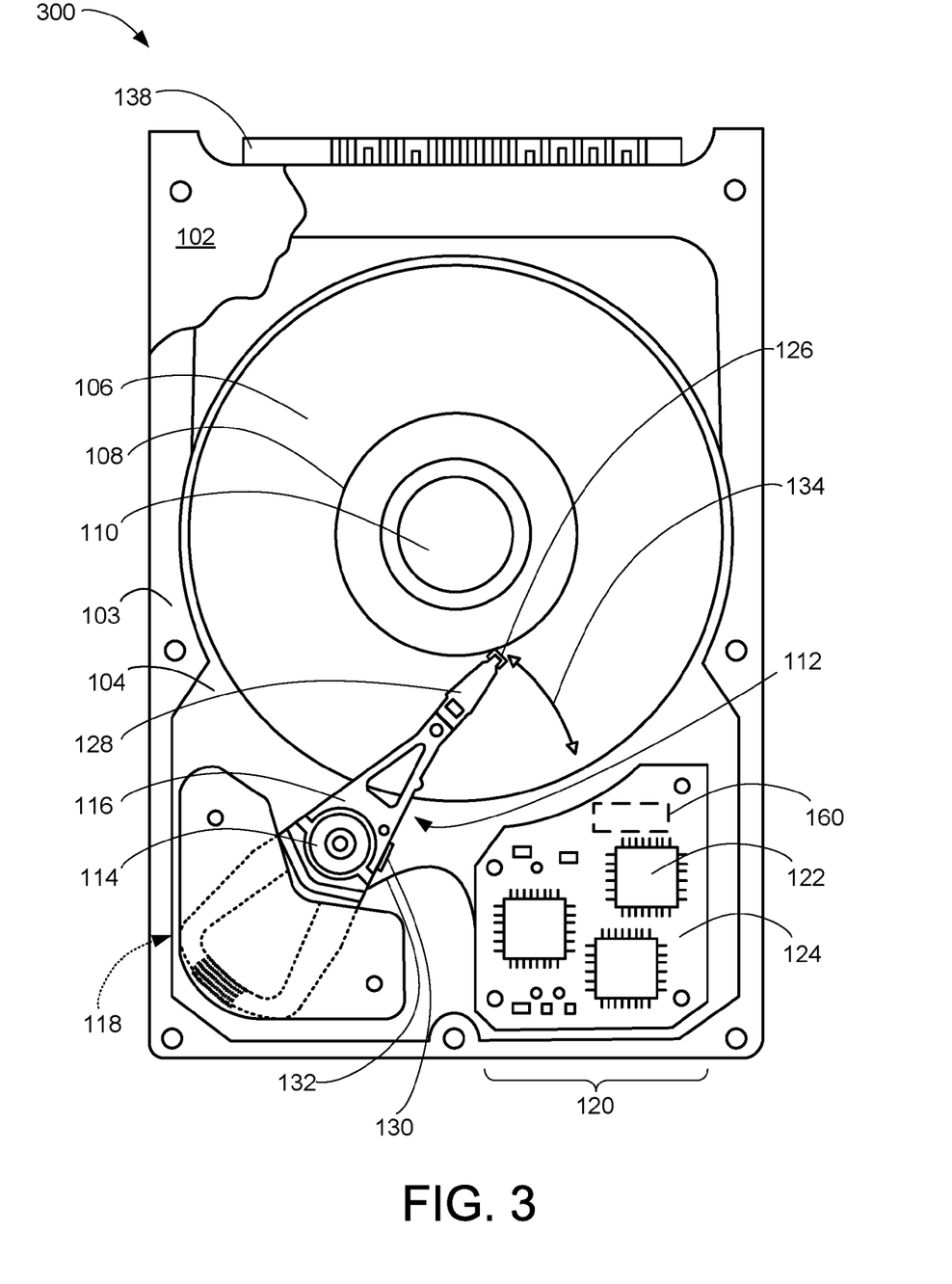
FIG. 3 provides a plan view of a hard disk drive including a connector block attached to a cover, according to one aspect of the present embodiments.

FIG. 3 provides a plan view of a hard disk drive including a connector block coupled to a cover, according to one aspect of the present embodiments. Elements of hard disk drive 300 having the same reference numerals as hard disk drive 100 may perform substantially similar functions as described herein with respect to hard disk drive 100. Hard disk drive 300 includes connector block 160. In some embodiments, connector block 160 communicatively connects PCBa 120 to drive connector 138. Connector block 160 may communicatively connect PCBa 120 to drive connector 138 through base 104. In some embodiments, connector block 160 is attached to base 104 and extends upward from PCBa 120 and attaches to cover 102 thereby increasing stiffness, damping, and vibration control of hard disk drive 300. Connector block 160 may further be attached to cover 102 by tape that surrounds a portion of connector 160 in contact with cover 102. In further embodiments, connector block 160 may be selectively positioned within the hard disk drive 300 in order to selectively control stiffness damping, and vibration.

Figure 4:
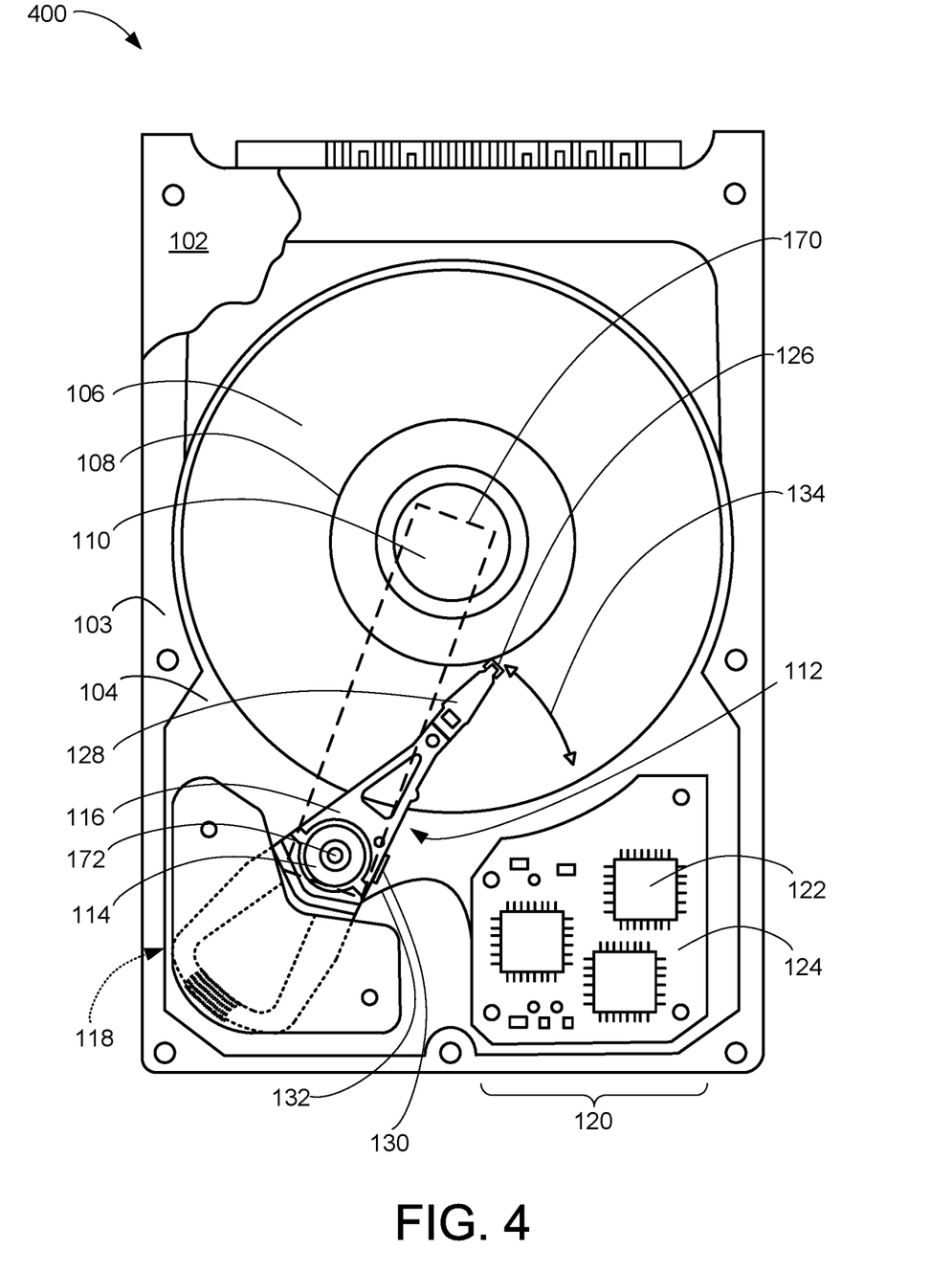
FIG. 4 provides a plan view of a hard disk drive including a first component attached to a second component, according to one aspect of the present embodiments.

FIG. 4 provides a plan view of a hard disk drive including a first component attached to a second component, according to one aspect of the present embodiments. Elements of hard disk drive 400 having the same reference numerals as hard disk drive 100 may perform substantially similar functions as described herein with respect to hard disk drive 100. In some embodiments, actuator arm assembly 112 pivots about pivot point 172. Hard disk drive 400 may include structure 170 that connects pivot point 172 and spindle motor assembly 110. Structure 170 may be configured to attach pivot point 172 to spindle motor assembly 110 via glue, screw, or other attaching structure or component. In some embodiments, the connecting of pivot point 172 and spindle motor assembly 110 by structure 170 thereby provides increased stiffness, damping, and vibration control to hard disk drive 400. The attaching of pivot point 172 to spindle motor assembly 110 provides added stiffness and damping as compared to when pivot point 172 and spindle motor assembly 110 are not attached together.

Figure 5:
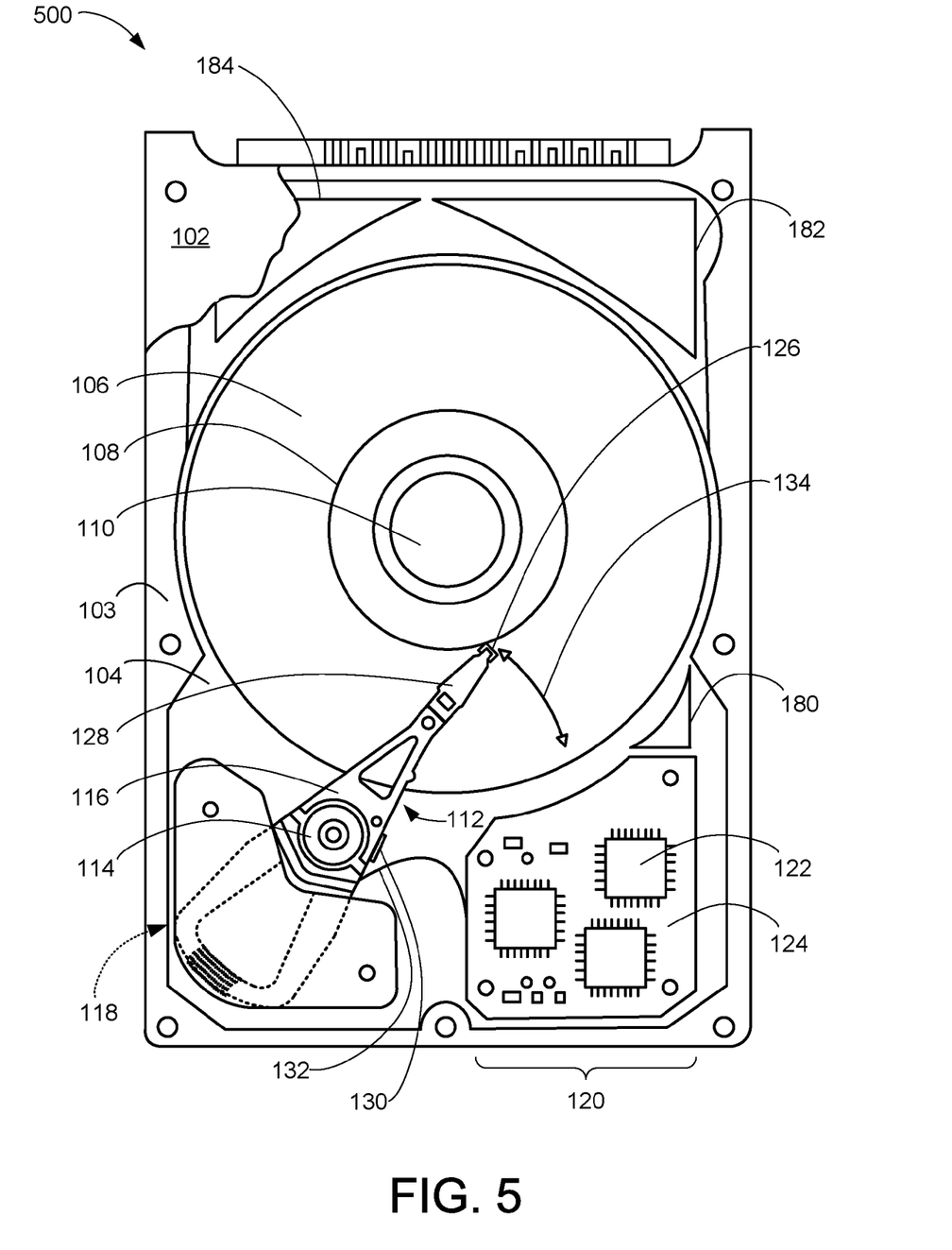
FIG. 5 provides a plan view of a hard disk drive including an additional component configured to reduce vibration of the hard disk drive, according to one aspect of the present embodiments.

FIG. 5 provides a plan view of a hard disk drive including an additional component configured to reduce vibration of the hard disk drive, according to one aspect of the present embodiments. Elements of hard disk drive 500 having the same reference numerals as hard disk drive 100 may perform substantially similar functions as described herein with respect to hard disk drive 100. In some embodiments, hard disk drive 500 includes (optional) structures 180-184. In some embodiments, structures 180-184 may be imitation components (e.g., primarily structural and/or non-functional) or functional components. Structures 180-184 may have various properties including thermally conductive properties, desiccation properties (e.g., silica type functions), or filter properties (e.g., for gas or moisture). In various embodiments, structures 180-184 may be created by injecting a material configured to expand into an open space within hard disk drive 150. In some embodiments, structures 180-184 may be made of an injected material configured for thermal transmission and attach PCBa 120 to base 104 and/or cover 102. In various embodiments, structures 180-184 may be made of a substantially rigid material including, but not limited to, steel, brass, copper, and/or bronze. Structures 180-184 may be selectively connected to base 104, cover 102, or both thereby providing increased stiffness, damping, and vibration control to hard disk drive 500.

Figure 6:
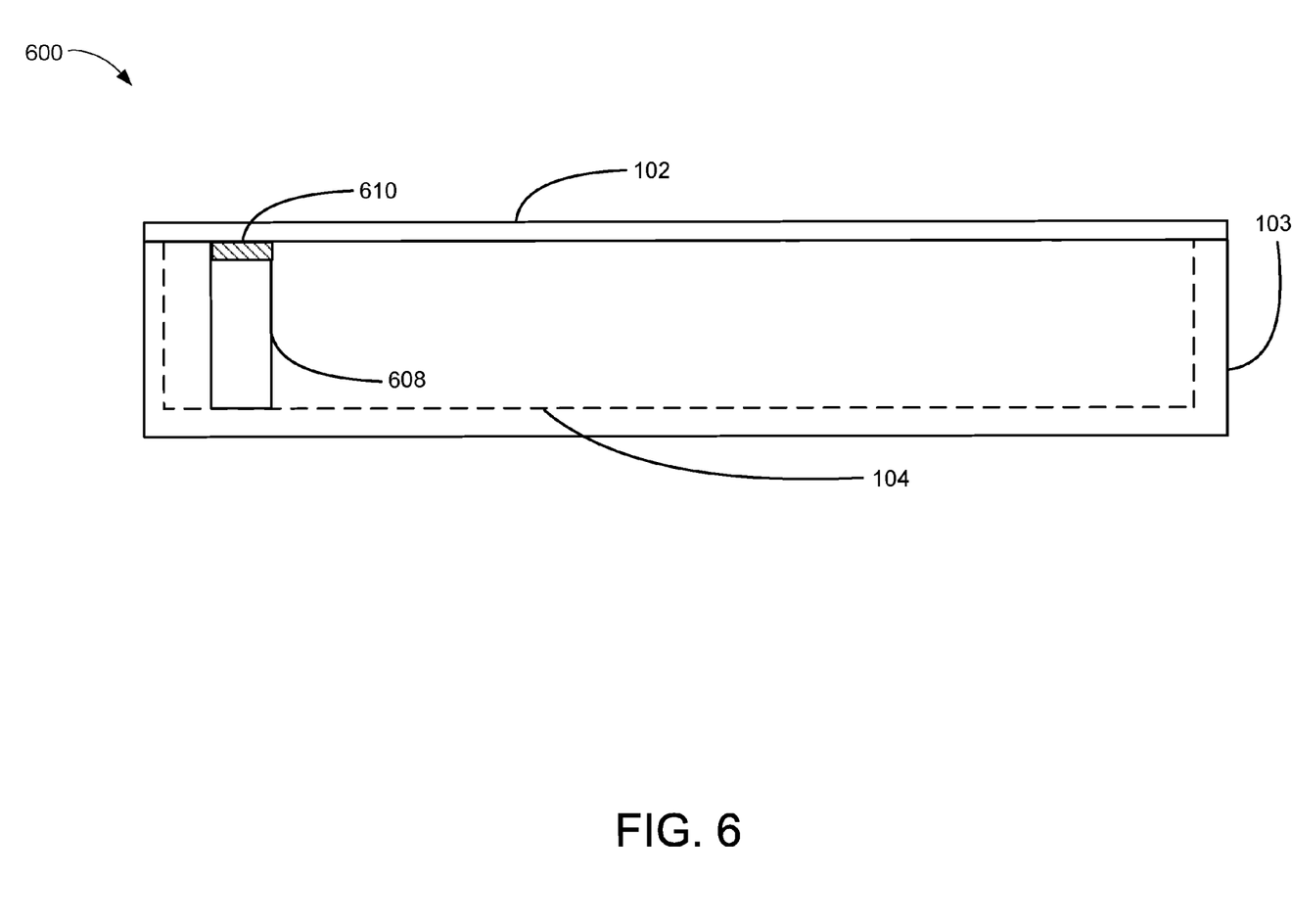
FIG. 6 provides a side view of a hard disk drive including a structure for adjusting vibration, according to one aspect of the present embodiments.

FIG. 6 provides a side view of a hard disk drive including a structure for adjusting vibration, according to one aspect of the present embodiments. Elements of hard disk drive 600 having the same reference numerals as hard disk drive 100 may perform substantially similar functions as described herein with respect to hard disk drive 100. Hard disk drive 600 includes cover 102, base 104, frame 103, and structure 608. In some embodiments, structure 608 is connected to base 104 and/or cover 102 to increase stiffness, damping, and/or vibration control of hard disk drive 600. In some embodiments, an upper portion 610 of structure 608 includes a rough or coarse surface that forms a friction attachment with cover 102 thereby countering axial pressure or shearing. The friction attachment with cover 102 may thereby selectively increase the stiffness, damping, and/or vibration control of hard disk drive 600.

The attachment of a component to the top and bottom of the device allows for the filling of otherwise dead space and creating a stronger structure. In some embodiments, cover 102 is thinner than base 104 and components may be attached to cover 102 and base 104 to distribute stiffness more evenly between cover 102 and base 104. In various embodiments, structure 608 may be a dummy or imitation component configured to maintain the relative location of cover 102 and base 104 when pressure that creates shear or bending between cover 102 and base 104 is created (e.g., during operation of a HDD).

Figure 7:
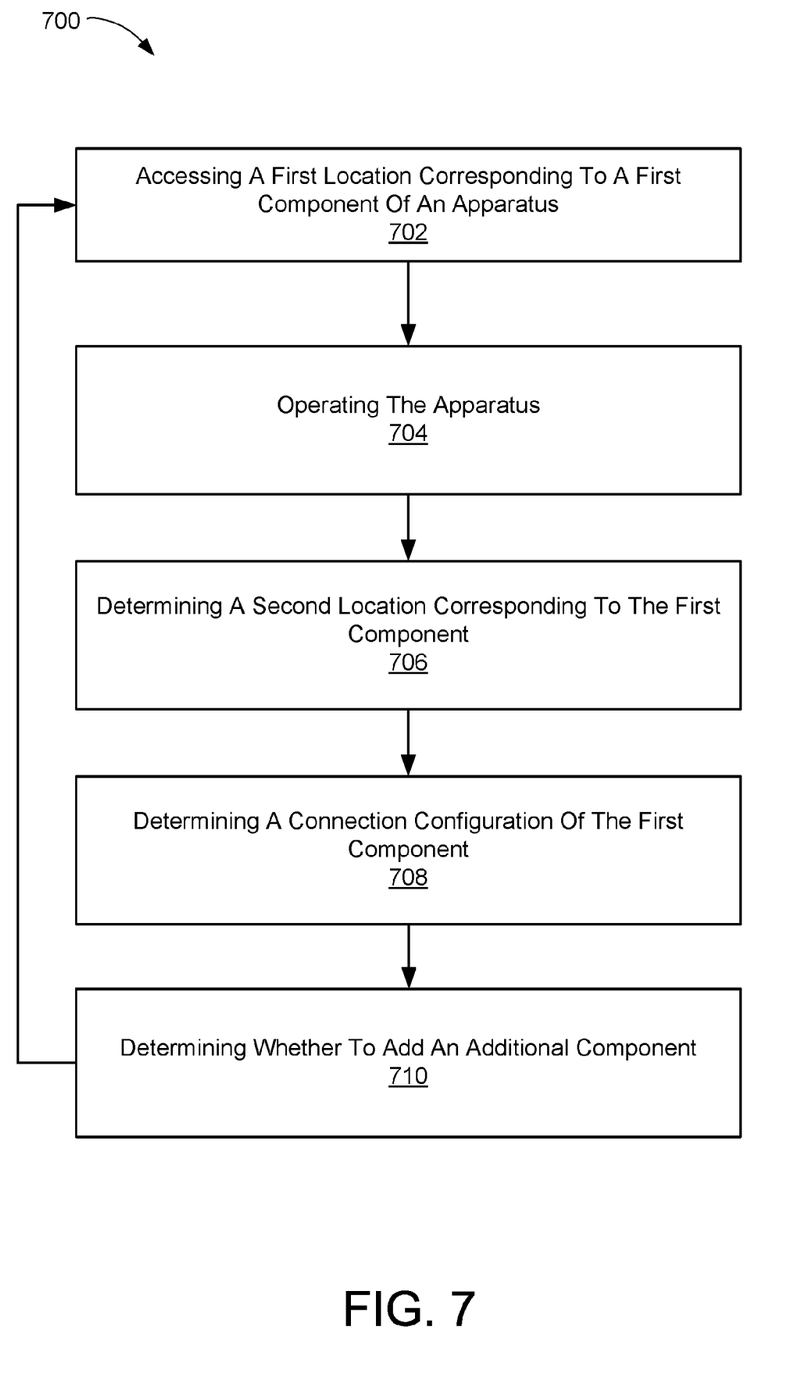
FIG. 7 shows an exemplary flow diagram for determining a component configuration, according to one aspect of the present embodiments.

FIG. 7 shows an exemplary flow diagram for determining a component configuration, according to one aspect of the present embodiments. Flowchart 700 depicts a process for determining locations and connection configurations of components in a device (e.g., a device including an electric motor assembly) to reduce vibration by adjusting stiffness, damping, and vibration response of the device. Flowchart 700 may be used to intelligently attach various components within a device or apparatus to improve the overall performance of the device (e.g., by increasing stiffness, damping, and vibration control). Portions of flowchart 700 may be performed multiple times in order to achieve increasing optimal configurations (e.g., converge to a respective location and respective attachment configuration) for each the components of a device.

At block 702, a first location corresponding to a first component of an apparatus is accessed. The apparatus may further include an electric motor assembly. In some embodiments, a datastore (e.g., database, data file, etc.) including location and connection information about components of a device (e.g., including an electric motor assembly such as a hard disk drive) may be accessed. In various embodiments, the location and connection information may be accessed by a simulator.

At block 704, the apparatus or device is operated. In some embodiments, a simulation (e.g., via a modeling tool configured for simulated annealing) is performed to simulate operation of the apparatus. The simulating may include determining a respective motion of each of a plurality of respective components of the apparatus. In various embodiments, the apparatus is operated and various sensors are used to detect a respective motion of each of the components of the apparatus. The motion and mode shapes of each component may be determined based on the operation (e.g., simulated or actual operation of the device).

At block 706, a second location corresponding to the first component is determined. The determination of a second location may be based on reducing vibration of a device (e.g., during operation of a hard disk drive). In some embodiments, properties of the operation of a device (e.g., HDD) including stiffness, vibration, etc., are considered in determining specific attachments or connections (e.g., to a top cover and a bottom portion of a device). In some embodiments, location of various components and the topology of the components is analyzed and compared to determine a particular topology to provide a desired performance effect (e.g., improved stiffness, damping, and vibration response). In some embodiments, dummy or imitation components may be used to balance a device and to determine a particular topology with desired performance. In various embodiments, the location and connection of a component as well as a subset thereof may be used in determining a particular topology.

The second location may be determined based on locating a mode shape that is undesirable and determining a location that will disrupt or break the mode shape lines between modes shapes. The location may be determined based on locating a maximum deflection or an acoustical problem, examining the modal analysis (e.g., including the shape of the deflection where a frequency of interest is and the maximum deflection) and connecting a component (e.g., PCBa 120) at that location to dampen the movement.

At block 708, a connection or attachment configuration of the first component is determined. The connection configuration may include connecting the first component to a second component. In some embodiments, the attachment configuration may include an attachment of the first component to a base and/or a cover. The attachment configuration may include an attachment of a pivot point to a motor attachment point to increase stiffness and damping. In some embodiments, the attachment configuration includes gluing, screwing, or laminating a first component to a second component. In various embodiments, a first component may be attached via friction to a second component.

At block 710, whether an additional component is to be added is determined. In some embodiments, an additional component (e.g., a structural component without other function) may be added based on determining that an additional component will reduce vibration (e.g., by increasing stiffness, damping, or vibration control). Block 702 may then be performed if additional analysis of components is desired.

As such, provided herein is an apparatus, including an electric motor, a bottom portion, and a top portion. The bottom portion or the top portion is connected to the electric motor. The apparatus further includes a first component connected to the bottom portion at a first location and connected to the top portion at a second location. A first connection of the first component at a first location is configured to increase stiffness. A second connection of the first component at a second location is also configured to increase stiffness. In some embodiments, the bottom portion is a base component of the apparatus and the top portion is a cover component of the apparatus.

The first location and second location may be configured to increase damping of the apparatus and reduce vibration. Furthermore, the first connection and the second connection may be configured to increase damping or reduce vibration. In some embodiments, the first component is connected to a second component and the connection of the first component to the second component increases the stiffness of the apparatus. In various embodiments, the first component is an imitation component. The first connection may be formed by an attachment process selected from the group consisting of gluing, screwing, and laminating. In some embodiments, the first component is connected to the top portion via a friction connection.

Also provided herein is an apparatus, including a first component and a second component. The second component is located at a first position and includes a first connection to the first component. The first position and the first connection are configured to stiffen an electric motor assembly. The first position and the first connection to the second component are configured to increase stiffness of the apparatus. In various embodiments, the first position and the first connection to the second component are further configured to reduce vibration and increase damping of the apparatus. In some embodiments, the second component is a cover component.

In an embodiment, the first component may have a second connection to a base component. In various embodiments, the second component is a functional component of the apparatus. In some embodiments, the second component includes a portion having a property selected from the group consisting of thermal conductance and desiccation. The first component may be a printed circuit board assembly (PCBa). In some embodiments, the first connection may be selected from the group consisting of glue, screw, and laminate.

Also provided herein is an apparatus, including a base component and a cover component attached to the base component. The cover component may be above the base component. The apparatus further includes an electric motor assembly and means for increasing vibration damping of the apparatus. A first portion of electric motor assembly is configured to rotate in between the base component and the cover component. The means for increasing vibration damping of the apparatus is connected to the base component and the cover component. The means for increasing vibration damping of the apparatus may be a component configuration that increases vibration damping of the apparatus.

In some embodiments, the means for increasing vibration damping of the apparatus is a structural component. In various embodiments, the means for increasing vibration damping of the apparatus is further configured to increase stiffness and vibration control. The means for increasing vibration damping of the apparatus may be further connected to the electric motor assembly. The connection of the means for increasing vibration damping of the apparatus to the electric motor assembly increases stiffness. In some embodiments, the means for increasing vibration damping of the apparatus is configured to distribute stiffness between the base component and the cover component.

While embodiments have been described and/or illustrated by means of examples, and while these embodiments and/or examples have been described in considerable detail, it is not the intention of the applicant(s) to restrict or in any way limit the scope of the embodiments to such detail. Additional adaptations and/or modifications of the embodiments may readily appear in light of the described embodiments, and, in its broader aspects, the embodiments may encompass these adaptations and/or modifications. Accordingly, departures may be made from the foregoing embodiments and/or examples without departing from the scope of the embodiments. The implementations described above and other implementations are within the scope of the following claims.

What is claimed is:

1. An apparatus comprising:
    an electric motor;
    a base connected to the electric motor; and
    a structural component connected to the base, wherein presence of the structural component is configured to increase stiffness and dampness associated with the apparatus, wherein the structural component is injected and expanded into an open space of the base.

2. The apparatus of claim 1, wherein the structural component comprises rigid material selected from a group consisting of steel, brass, copper, and bronze.

3. The apparatus of claim 1 further comprising another structural component connected to the base, wherein presence of the another structural component is configured to increase stiffness and dampness associated with the apparatus.

4. The apparatus of claim 1, wherein the structural component is configured to attach a printed circuit board of the apparatus to the base.

5. An apparatus comprising:
    an electric motor;
    an actuator arm assembly configured to pivot about a pivot bearing to move with respect to data storage disk to read and write data thereto;
    a voice coil motor configured to control movement of the actuator arm assembly; and
    a structure configured to connect the pivot bearing of the actuator arm assembly to the electric motor, wherein the structure is configured to increase stiffness and dampness associated with the apparatus.

6. The apparatus of claim 5, wherein the pivot bearing is connected to a base of the apparatus.

7. The apparatus of claim 5, wherein the structure is connected to the pivot bearing via glue.

8. The apparatus of claim 5, wherein the structure is connected to the pivot bearing via a screw.

9. The apparatus of claim 5 further comprising a printed circuit board is attached to a base of the apparatus, wherein attachment of the printed circuit board to the base is configured to increase stiffness and dampness associated with the apparatus.

10. The apparatus of claim 9, wherein the printed circuit board is attached to the base via glue.

11. The apparatus of claim 9, wherein the printed circuit board is attached to the base via screw.

12. The apparatus of claim 9, wherein the printed circuit board is connected substantially to a middle portion of the base.

13. The apparatus of claim 5, wherein the structure is connected to a pole of the apparatus.

14. An apparatus comprising:
    a base component;
    a cover component; and
    a structural component connected to the base component, wherein the structural component is configured to stiffen an electric motor assembly, and wherein structural component includes a thermal conductance property or a desiccation property.

15. The apparatus of claim 14, wherein connection of the structural component to the base component substantially dampens vibration of the apparatus.

16. The apparatus of claim 14 further comprising a printed circuit board assembly connected to the base component.

17. The apparatus of claim 14, wherein the structural component is connected to the base component via glue, screw, or laminate.

18. The apparatus of claim 14 further comprising a top cover component, wherein the structural component is configured to distribute stiffness between the base component and the top cover component.

* * * * *